(12) United States Patent
Wasson

(10) Patent No.: US 6,402,263 B1
(45) Date of Patent: Jun. 11, 2002

(54) DUAL ACTUATION MASTER CYLINDER

(75) Inventor: Andrew Paul Wasson, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/912,187

(22) Filed: Jul. 24, 2001

(51) Int. Cl.$^7$ .............................. B60T 13/12; B60T 8/44
(52) U.S. Cl. ...................... 303/114.3; 60/562; 60/547.1
(58) Field of Search ........................ 303/5, 114.1, 114.3; 188/15 R, 345, 358, 359; 60/545, 547.1, 547.2, 562, 589; 91/369.1, 376 R

(56) References Cited

U.S. PATENT DOCUMENTS

| | | | | |
|---|---|---|---|---|
| 4,132,073 A | * | 1/1979 | Ewald | 60/562 |
| 4,621,498 A | * | 11/1986 | Schaefer | 60/562 |
| 4,905,570 A | * | 3/1990 | Reinartz et al. | 91/369.1 |
| 5,065,580 A | * | 11/1991 | Nishii | 60/547.1 |
| 5,279,125 A | * | 1/1994 | Keyes et al. | 60/562 |
| 5,720,170 A | * | 2/1998 | Hageman et al. | 60/562 |
| 5,943,863 A | * | 8/1999 | Jordan | 60/562 |

* cited by examiner

Primary Examiner—Christopher P. Schwartz
(74) Attorney, Agent, or Firm—Leo H. McCormick Jr.; Warren Comstock

(57) ABSTRACT

A master cylinder (12) for use in a brake system (10). The master cylinder (12) has a housing (22) with a first (42) and second (44) pistons located in a bore (20) by first (46) and second (48) resilient members to define first (50) and second (52) chambers therein. The first (50) and second (52) chambers are respectively connected to a reservoir (32) to receive fluid and maintain a desired fluid level in the brake system (10) and to front (24,24') and rear (26,26') wheel brakes to supply pressurized fluid to effect a brake application. Fluid received from the reservoir (32) by [to] the second chamber (52) is controlled by a center port compensation valve (148). The center port compensation valve (148) has a head (126') connected to a linkage member (98') that joins a first retainer (94') with a second retainer (96') to cage the second resilient member (48). An actuation arrangement has a first input member (14) that responds' to an operator input to initially move the first piston (42) and the second (44) piston to compress the second (48) resilient means and allow head (126') to engage a seat (40') to terminate communication between reservoir (32) and the second chamber (52). Thereafter movement of the second piston (44) pressurizes fluid in the second (52) chamber to effect a first brake application. The actuation arrangement is characterized by a second input member (200) that responds to an electronic signal to develop a force that acts on a plunger to compress the second resilient member (48) and move the head (126') into engagement with seat (40') to terminate communication from the reservoir (32) to the second- chamber (52) and thereafter moves to pressurize fluid in the second chamber (52) and effect a second brake application.

8 Claims, 3 Drawing Sheets

DUAL ACTUATION MASTER CYLINDER

This invention relates to a master cylinder having mechanical actuation for effecting a first brake application in response to an operator input and electronic actuation for effecting a second brake application in response to an input from an electronic control unit.

BACKGROUND OF THE INVENTION

U.S. Pat. Nos. 5,018,353 and 5,111,661 disclose master cylinders wherein compensation between a first chamber in a bore of a housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into the radial port, U.S. Pat. Nos. 5,207,062 and 5,279,125 disclose the use of a second center port compensation valve through which compensation is achieved for the second chamber in a bore. In master cylinders having such separate compensation valves for the first and second pressurizing chambers in the bore communication typically occurs through ports from separate passages in the housing when the first and second pistons are in a rest position. As the first and second pistons approach the rest position, stop pins engage the compensation valves to open the compensation valve and initiate communication between the reservoir and bore. Unfortunately, the passage required by the rear piston is quite long as the compensation port needs to be located adjacent the end of the housing for the master cylinder. In addition, when such master cylinders are recessed into a front chamber of a vacuum brake booster care needs to be taken with respect to sealing structure to assure that vacuum does not draw fluid into the vacuum brake booster.

U.S. Pat. No. 5,943,863 discloses a master cylinder having first and second center port compensation valves respectively associated with first and second caging arrangements that locates the first and second pistons in a bore of a master cylinder. In this master cylinder, each of the center port compensation valves has a poppet that extends from a stem that joins a first retainer to a second retainer to cage a return spring. In response to an input force applied to a first piston by an operator, the first and second pistons move in the bore to initially compress the return springs and thereafter allow the poppet to engage a seat and seal first and second chambers to thereafter develop pressurized fluid and effect a brake application. This type master cylinder functions in an adequate manner for service brake application, however, when additional functions are introduced into a brake system, such as traction and sway control, additional structure of a type disclosed in U.S. Pat. No. 5,456,525 is required to provide pressurized fluid to accomplish the desired function.

SUMMARY OF THE INVENTION

A primary object of the present invention is to provide a brake system with a master cylinder having a first mode of operation that responds to an operator input to develop pressurized fluid and effect a corresponding first brake application and having a second mode of operation that responds to an electronic input to develop pressurized fluid and effect a corresponding second brake application.

According to this invention, a brake system is equipped with a master cylinder having a housing with a bore therein. The bore is connected to a reservoir by a radial port and an axial port and to the brake system through first and second outlet ports. First and second pistons are positioned in the bore by a first resilient member located between the first and second pistons to define limits for a first chamber and by a second resilient member located between the second piston and the bottom of the bore to define limits for a second chamber. The first and second resilient member each include a first spring and a second spring. The first spring is caged between a first retainer and a second retainer by a linkage member. The linkage member has a stem with a head that engages the first retainer and an end that engages the second retainer to hold the first spring between the first and second retainers. The second spring is located between the head and the first retainer member. The first chamber is connected to the radial port through an axial passage in the second piston while the second chamber is connected to the axial port in the housing. The first and second pistons respond to an input force applied to the first piston by a first input member by initially moving within the bore to compress the first springs of the first and second resilient members and thereafter allow the second springs to simultaneously move the head on the stem of the linkage member of the first resilient member into engagement with a seat on the second piston to seal the axial passage and the head on the stem the linkage member of the second resilient means into engagement with a seat for the axial port of the housing to terminate communication between the bore and the reservoir. Further movement of the first and second pistons by the input force from the operator into the first and second chambers develops pressurize fluid which is supplied to the brake system through the first and second outlet ports to effect a first brake application. A second input member has a plunger sealingly located in the axial port of the housing. The plunger has a cylindrical base that forms a surface for a seat for the head on the head of the linkage member of the second resilient member. The plunger has a passage or concentric axial bore through which the second chamber is connected to the reservoir. A solenoid associated with the plunger is connected to an electronic control unit (ECU). The ECU receives inputs relating to the operational conditions of the vehicle and environment and if the ECU determines that the vehicle is experiencing or may experience undesirable conditions that may effect the safe operation of the vehicle, an input signal is supplied to activate the solenoid valve. Activation of the solenoid valve causes the plunger to initially move its cylindrical base into the second chamber and compress the first spring and allow the second spring to urge the head on the stem into engagement with the seat formed on the plunger to seal the second chamber from the reservoir. Thereafter, further movement of the plunger into the second chamber pressurizes fluid in the second chamber that is communicated to the rear wheel brake to effect a second brake application and attenuate the effect of the undesirable conditions.

An advantage of this brake system is provided by a master cylinder with first and second input members to develop pressurized fluid to effect corresponding first and second brake applications.

A still further advantage of this invention is provided by a second input member which moves a seat to initially seal an operational chamber from a reservoir and thereafter move to develop pressurized fluid in the operational chamber to effect a brake application.

Another advantage this invention resides in a solenoid valve that has a plunger with a seat thereon through which an operational chamber is communicated to a reservoir that is activated to engage a poppet on a compensation valve and moves into the operational chamber to develop pressurized fluid therein and effect a brake application.

A still further advantage of the present invention resides in an ability to simultaneous actuate of first and second input member of a master cylinder to reduce the actuation time in the development of pressurized fluid to effect a brake application.

DETAILED DESCRIPTION

Figure 1:
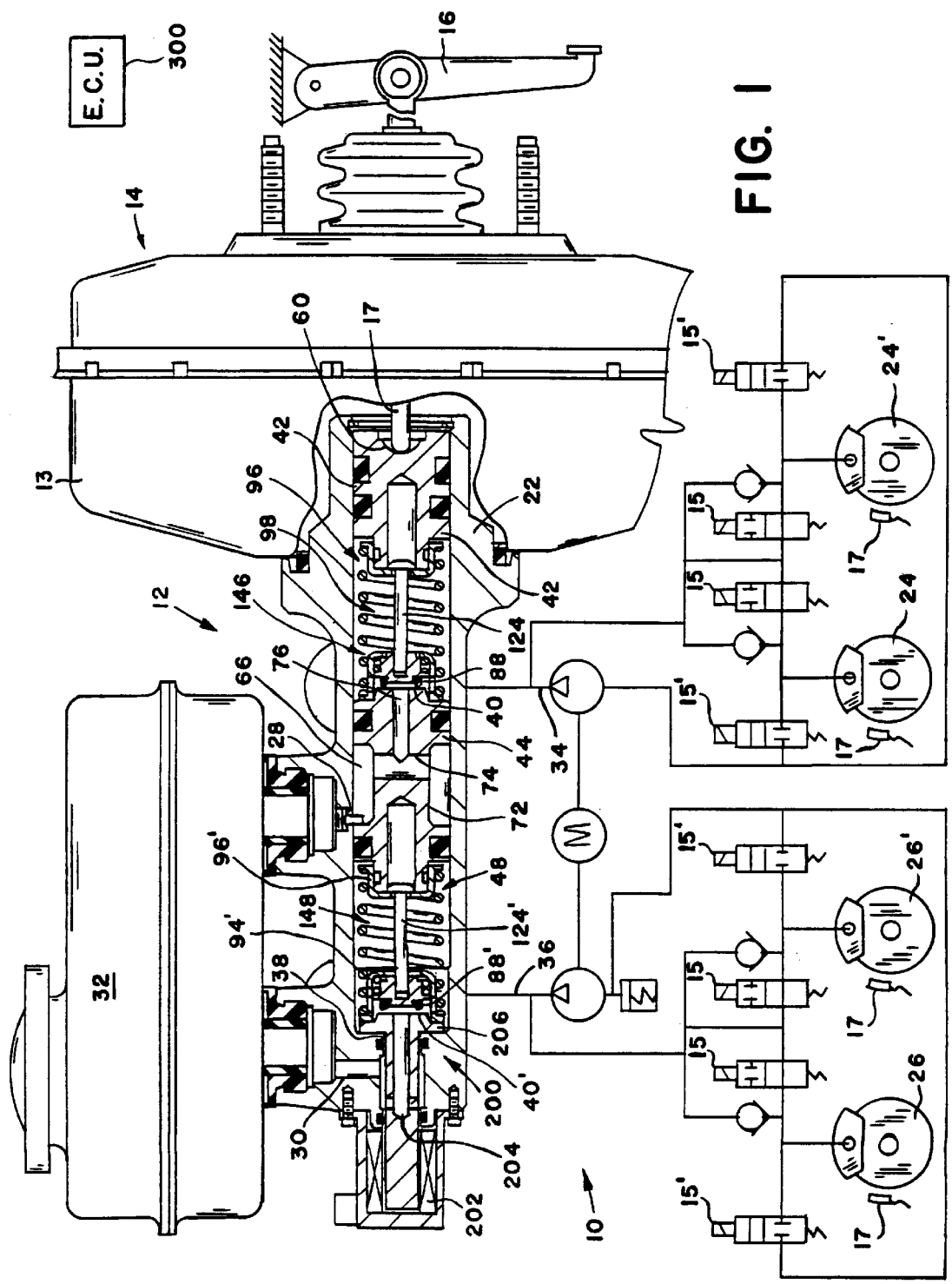
FIG. 1 is a schematic illustration of a brake system with a sectional view of a master cylinder having first and second input members for developing pressurized fluid to effect corresponding brake applications in accordance with the principals of this invention.

The brake system 10 illustrated in FIG. 1 includes a master cylinder 12 that is connected to a front chamber of a vacuum brake booster 14. The brake booster 14 receives an input force from brake pedal 16 to provide master cylinder 12 with an actuation force for moving first 42 and second 44 pistons located in bore 20 of housing 22 to provide the front 24,24' and rear 26,26' wheel brakes of a vehicle with pressurized fluid to effect a brake application. The front 24,24' and rear 26,26' wheel brakes are each equipt with a variety of sensors including a build solenoid valve 15, a decay valve 15' and a wheel speed sensor 17 that communicates information to an electronic control unit (ECU) 300 to provide current information relating to the functional operation of the vehicle with respect to a road surface and the brake system 10. The ECU 300 also receives information relating to other inputs and data relating to the operation of the vehicle which may have an effect of a brake application or the safe operation of the vehicle including but not limited to the operation of a motor pump "M" a separate source of pressurized fluid for the vehicle, the pressure of a pressurized supply fluid, dynamic forces experienced by the vehicle, accumulator fluid supply, the level of fluid in a reservoir, and etc. The ECU 300 evaluates the data and information receives from the various sensors and activates [the] an appropriate build solenoid valve 15 and/or decay valve 15' with a signal whereby pressurized fluid may be provided to a corresponding front 24,24' and/or rear 26,26' wheel brake to effect a brake application therein and attenuate a condition that may have an effect on the safe operation of the vehicle. The rear wheel brakes 26,26' are of a Drum-in-Hat construction of a type disclosed in U.S. Pat. No. 6,234,278 and U.S. application Ser. No. 09/916,708 wherein a manual input is utilized to effect a parking brake application.

Figure 2:
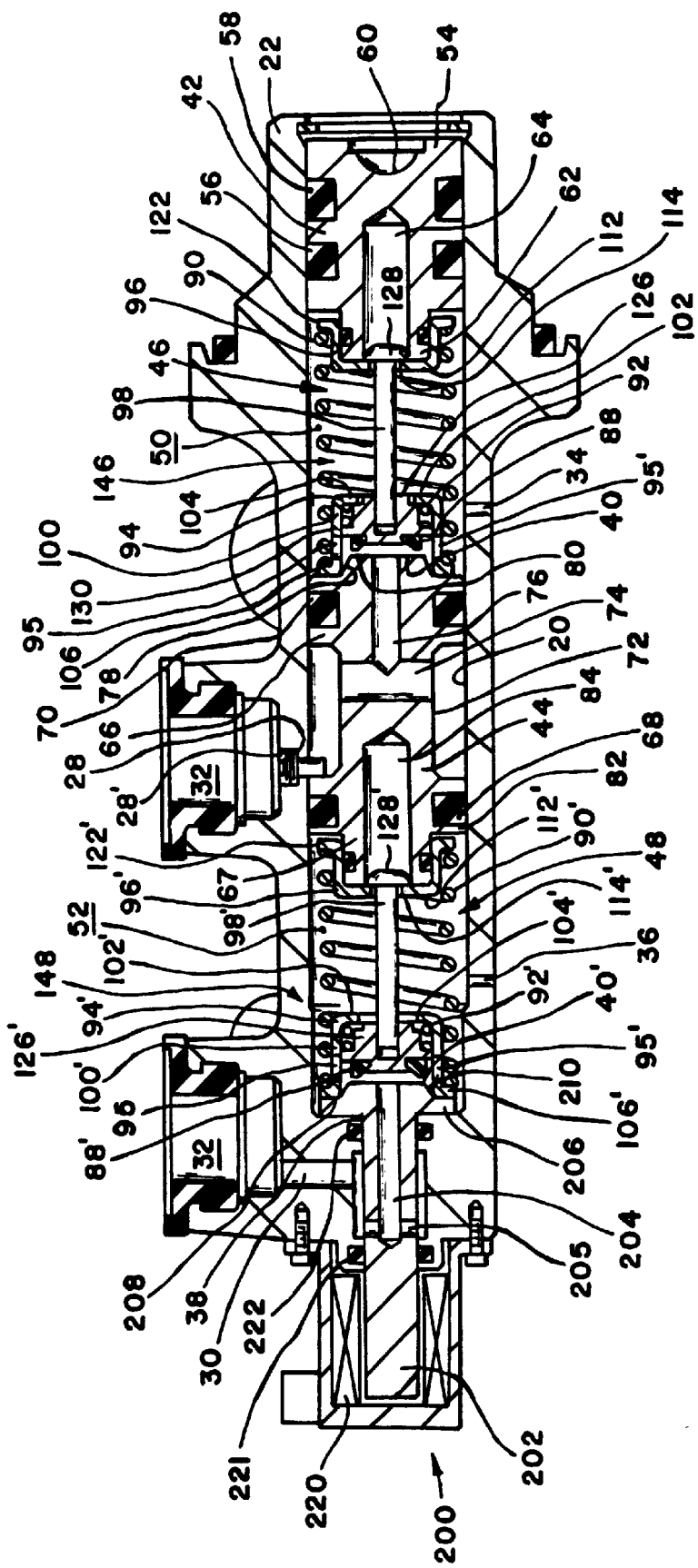
FIG. 2 is an enlarged sectional view of the master cylinder of FIG. 1.

The master cylinder 12 is shown in more detail in FIG. 2 and has a housing 22 with a bore 20 therein. Bore 20 is connected by a radial port 28 and a passage 30 to a reservoir 32 and to the front 24,24' and rear 26,26' wheel brakes through outlet ports 34 and 36. A solenoid valve 200 that functions as a second input means has a plunder 202 with a cylindrical base 206 that is located opening 38 of passage 30 to define a seat 40' for an annular seal 88' of a center port compensation valve 148. The first 42 and second 44 pistons of the master cylinder 12 are positioned in bore 20 by first 46 and second 48 resilient means to define a first chamber 50 and a second chamber 52.

The first piston 42 has a cylindrical body 54 with grooves therein for retaining first 56 and second 58 seals to seal bore 20 from the surrounding environment, an axial depression 60 for receiving a head on an output push rod 17 from the vacuum brake booster 14 and a projection 62 with an axial bore 64 therein.

The second piston 44 has a cylindrical body 66 with grooves for receiving seals 68 and 70 and a compensation groove 72 connected by a radial passage 74 to an axial passage 76 opened to chamber 50. An annular projection 78 on face 80 of the cylindrical body 66 surrounds axial passage 76 to define a seat 40 for a center port compensation valve 146. An annular projection 67 that extends from face 82 on piston 44 has an axial bore 84 therein. A stop bolt 28' is located in radial port 28 and extends into compensation groove 72 to limit the lateral movement of the second piston 44 within bore 20 to the axial length of the compensation groove 72.

The first resilient means 46 is located in bore 20 between the first 42 and second 44 pistons to define the limits for the first chamber 50 while the second resilient means 48 is located between the cylindrical base 206 on plunger 202 located in opening 38 of passage 30 in bore 20 and the second piston 44 to define the limits for the second chamber 52. The strength of the first 46 and second 48 resilient means is such that the second resilient means 48 urges piston 44 into engagement with stop bolt 28' to aligned compensation groove 72 of piston 44 with radial passages 2.8 and as a result passages 74 and 76 are always connected with reservoir 32.

The first 46 and second 48 resilient means are essentially identical in structure and functional operation and may hereinafter be identified by a same number plus.

The first resilient means 46 as best illustrated in FIG. 2 is located in bore 20 of the master cylinder 14 and includes a first spring 90 and a second spring 92. The first spring 90 is caged between a first retainer 94 and a second retainer 96 by a linkage arrangement or member 98 while the second spring 92 is located between the first retainer 94 and a head 126 of stem 124 of linkage member 98.

The second spring 92 urges a poppet 88 on head 126 on stem 124 toward a seat 40 on cylindrical body 66 of the second piston 44 to control communication between bore 20 and reservoir 32. Thus, the second spring 92 and head 126 function as a first center port compensation valve 146.

The first retainer 94 has a cylindrical cone or body 100 that extends from a base 102 to define a first cup. The base 102 has an axial opening 104 while the cylindrical body 100 has an outward peripheral flange 106 on an open end thereof. The cylindrical cone or body 100 has a plurality of openings 95,95' that allows for unrestricted flow of fluid between passage 76 and chamber 50 when flange 106 engages surface 80 on cylindrical body 66 of piston 44.

The second retainer 96 has a cylindrical cone or body that extends from a base 112 to define a second cup. The base 112 has an axial opening 114 that is connected by a slot to a larger diameter opening that is offset axial opening 114. The cylindrical body has an open end with a peripheral flange 122 for positioning retainer 96 on a projection which extends from a piston 42 to align the second retainer 96 within bore 20.

The linkage arrangement or member 98 includes a stem 124 with a head 126 that engages base 102 of the first retainer 94 and a button end 128 that after passing through axial opening 104 in the first retainer 94 and the offset larger diameter opening in the second retainer 96 is shifted to axial opening 114. Thereafter button end 128 on stem 124 which has a larger diameter than opening 114 engages base 112 to cage the first spring 90 between the first 94 and second 96 retainers. The head 126 on stem 124 has a cylindrical body with an annular face seal that defines a poppet 88 for the center port compensation valve 146. The second spring 92 is located between base 102 of the first retainer 94 and a rib 130 on the cylindrical body of head 126 to urge poppet 88 toward a seat 40 formed on face 80 on cylindrical body 66 of the second piston 44.

The second resilient means 48 as best illustrated in FIG. 2 is located in bore 20 of the master cylinder 14 and includes a first spring 90' and a second spring 92'. The first spring 90' is caged between a first retainer 94' and a second retainer 96' by a linkage member 98'.

The second spring 92' which is located between the first retainer 94' and head 126' of linkage member 98' urges a poppet 88' on head 126' of stem 124' toward a seat 40' to control communication between chamber 52 and reservoir 32 and thus functions as a second center port compensation valve 148.

The first retainer 94' has a cylindrical cone or body 100' that extends from a base 102' to define a first cup. The base 102' has an axial opening 104' while the cylindrical body 100' has an outward peripheral flange 106' on an open end thereof. The cylindrical cone or body 100' has a plurality of openings 95,95' which allows for unrestricted flow of fluid between axial passage 38 by way of bore 204 in plunger 202 of solenoid valve 200 and chamber 52 when the open end of cylindrical cone or body 100' engages cylindrical base 206 on plunger 202.

The second retainer 96' has a cylindrical cone or body that extends from a base 112' to define a second cup. The base 112' has an axial opening 114' that is connected by a slot to a larger diameter opening that is offset from axial opening 114'. The cylindrical body has an open end with a peripheral flange 122' for positioning retainer 96' on a projection which extends from piston 44 to align the second retainer 96' within bore 20.

The linkage arrangement or member 98' includes a stem 124' with a head 126' which engages base 102' of the first retainer 94' and a button end 128' that after passing through axial opening 104' in the first retainer 94' and the larger offset diameter opening in the second retainer 96' is shifted to axial opening 114'. Button end 128' of stem 124' has a larger diameter that axial opening 114' and engages base 112' to cage the first spring 90' between the first 94' and second 96' retainers. The head 126' of stem 124' has a cylindrical body with an annular face seal that defines a poppet 88' for center port compensation valve 148. The second spring 92' is located between base 102' of the first retainer 94' and a rib 130' on the cylindrical body of head 126' to urge poppet 88' toward a seat 40' formed on surface 210 on cylindrical base 206 of plunger 202.

The solenoid valve 200 which forms the second input member includes a coil 220 that surrounds a plunger 202 and is connected to the ECU 300. Plunger 202 is located in opening 38 of passage 30 in housing 22 and has an axial bore 204 therein that extends from a cylindrical base 206 to a cross bore 205. Reservoir 32 is connected to reservoir 32 by way of axial bore 204, cross bore 205 and passage 30. A low pressure seal 221 that is retained in housing 22 engages plunger 202 to prevent fluid. from being communicated from reservoir 32 to the environment while allowing free communication between the reservoir 32 and the second chamber 52. The cylindrical base 206 has a surface 208 for receiving flange 106' on the first retainer 94' and an annular raised surface 210 which forms seat 40' for annular face seal 88' on head 126' of the second center port compensation valve 148. A high pressure seal 222 retained in housing 22 engages plunger 202 to prevent pressurized fluid from being communication from the second chamber 52 to the reservoir 32 along a flow path between the peripheral surface of the plunger 202 and opening 38 into the second chamber 52.

In the rest position, as illustrated in FIG. 1, fluid from reservoir 32 is freely communicated to chamber 52 by way of passage 30 and axial bore 204 in plunger 202 of solenoid valve 200 while fluid is communicated to chamber 50 by way of radial port 28, groove 72, radial passage 74 and axial passage 76 in piston 44. It should be understood that fluid freely flows to chambers 50 and 52 through openings 95,95' in first retainer 94 and openings 95,95' in first retainer 94'. Because of the location of the radial port 28 and the communication of fluid through the second piston 44 to chamber 50, the housing 20 of the master cylinder 14 can be inserted into the front chamber 15 of the booster housing 13 to create a compact unitary structure. Further with the such communication paths, the design of seals 56 and 58 on piston 42 are simplified as the fluid in chamber 50; with piston 42 in the rest position as illustrated in FIG. 1, is not under pressure and thus only limited stress is placed thereon by vacuum located in chamber 15.

When the master cylinder 12 and booster 14 are installed in a vehicle and a brake application is desired, an input force is applied to brake pedal 16 to operate the brake booster 14. The brake booster 14 creates an output force that is communicated through push rod 17 to the first piston 42. Initially, the output force simultaneously moves pistons 42 and 44 to compress springs 90,90' and allow springs 92,92' to move the annular face seals or poppets 88,88' on heads 126,126' into engagement with seats 40,40' to seal chambers 50 and 52. Thereafter, further movement of piston 42 by the input force causes the development of fluid pressure in chambers 50 and 52 that is respectively communicated through ports 34 and 36 to the front wheel brakes 24,24' and rear wheel brakes 26,26' to effect a brake application. When the brake application is completed, the output force from push rod 17 acting on the first piston 42 ceases and springs 90,90' expand to move the linkages 98,98' back into engagement with the first 94,94' and second 96,96' retainers. As springs 90,90' expand, springs 92,92' are compressed and as a result the annular face seals 88,88' move away from seats 40,40' to again establish communication between the reservoir 32 and chambers 50 and 52 and allow fluid to flow into and maintain the fluid level in the brake system at capacity in a manner as illustrated in FIGS. 1 and 2.

Figure 3:
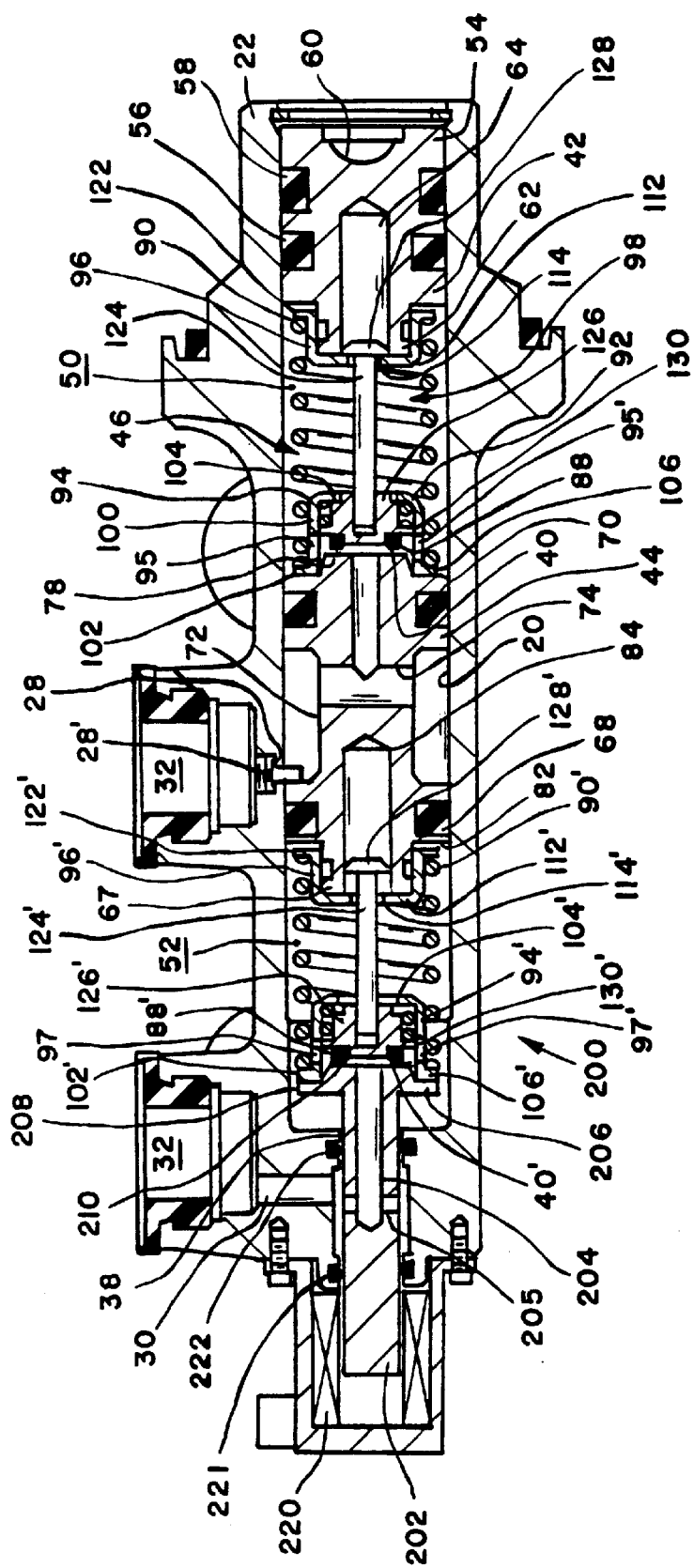
FIG. 3 is a sectional view of the master cylinder of FIG. 1 illustrating a second operating mode wherein pressurized fluid to effect a brake application is derived as a function of an electronic input from an ECU.

During the operation of the vehicle, inputs are continually being received by the ECU 300 relating to vehicle speed, fluid conditions in a brake system, friction conditions between a tire and a road surface, sway of the vehicle with respect to a road surface, and etc. that may effect a safe operation of the vehicle. In a situation where one of the rear (drive) wheels, 24,24' is turning faster than the other as detected by a wheel speed sensor 17, a most efficient use of power of the engine is not being achieved as spinning is occurring between the one wheel and the surface of the roadway. In this situation, the ECU 300 initiates a traction control function wherein the spinning wheel is braked and power directed to the other wheel that has more traction to better utilize the power of the engine. To achieve this traction control function in a manner as taught by the present invention, an electrical signal is sent from ECU 300 to energize coil 220 of solenoid valve 200. The energization of coil 200 acts on plunger 202 and after overcoming return spring 90' moves surface 210 on plunger 202 into engagement with face seal 88' to terminate communication between reservoir 32 and chamber 52. Since piston 44 is held in a stationary position by stop bolt 28 and once seal 88' engages seat 40' further movement of plunger 202, see FIG. 3, causes pressurization of fluid in chamber 52 that is communicated to the appropriate rear (drive) wheel brake 24,24' to effect a brake application which will attenuate a potential undesirable operational condition for the vehicle. During such a traction control actuation, if an operator does not hear the engagement of the friction pads with the rotor, an operator will most likely be unaware of the traction control operation as the first piston 42 and correspondingly brake pedal 16 remains stationary. When the ECU 300 determines that the traction control condition has been alleviated or eliminated, the signal to coil 220 is terminated and return spring 90' acts on the cylindrical body 206 to return plunger 202 to a rest position as illustrated in FIG. 1.

For some brake applications, it may be desirable to reduce the dead travel required to close the compensation valves 146 and 148. A reduction in the dead travel can be achieved by the simultaneous actuation of coil 220 with the movement of the first piston 42 by an input force from the operator. A sensor such as associated with a stoplight would provide ECU 300 with a signal to indication that an operator desired to make a brake application. When the ECU 300 receives such a signal, an actuation signal would be provided to activate coil 220 and move plunger 202 toward the second piston 44 at the same time the manual input is applied to the first piston 42 to cause a more rapid closure of the center port compensation valves 146, 148 and correspondingly a faster pressurization of fluid to effect a brake application.

Further the invention disclosed herein may be utilized with a manual brake application to provide a parking brake application. Current parking brake requirements provide that a manual input must be capable to hold a vehicle on an incline. If the vehicle is on a greater incline, the present invention could supplement the holding of the vehicle in the following manner. A signal supplied to the ECU 300 on actuation of the parking brake, would trigger a corresponding signal being supplied to coil 220 which would be actuated in a manner described above with respect to FIG. 3 to supply pressurized fluid to the rear wheel brakes 26,26'.

In the drawings the drive wheels are illustrated as being the rear wheels of the vehicle but the invention would equally apply it drive wheel where the front wheels.

I claim:

1. A master cylinder (12) for use in a brake system (10) having a housing (22) with a first (42) and second (44) pistons located in a bore (20) by first (46) and second (48) resilient members to define first (50) and second (52) chambers therein, said first (50) and second (52) chambers respectively being connected to a reservoir (32) to receive fluid and maintain a desired fluid level in said brake system (10) and to front (24) and rear (26) wheel brakes to supply pressurized fluid to effect a brake application, said fluid received from said reservoir (32) by said second chamber (52) being controlled by a center port compensation valve (148) having a head (126') connected to a linkage arrangement (124') that joins a first retainer (94') with a second retainer (96') to cage said second resilient member (48), actuation means having a first input member (14) which responds to an operator input to initially move said first (42) and second (44) pistons to compress said second (48) resilient members and allow said head (126') to engage a seat (40') to terminate communication from said reservoir (32) to said second (52) chamber and thereafter pressurize fluid in said second (52) chamber to effect a first brake application, said actuation means being characterized by a second input member (200) that responds to an electronic signal to move a plunger (202) to compress said second resilient means (48) and bring said seat (40') into engagement with said head (126') to terminate communication from said reservoir (32) to said second chamber (52) and thereafter move said plunger into said second chamber (52) to pressurize fluid therein and effect a second brake application.

2. The master cylinder (12) as recited in claim 1 wherein said second input member is characterized by a solenoid valve (200) and in that said plunger (202) has an axial bore (204) that extends from a cylindrical base (206) and in that said cylindrical base (206) has a surface that forms said seat (40') while said axial bore (204) provided communication between said second chamber (52) and said reservoir (32).

3. The master cylinder (12) as recited in claim 1 wherein said second input member is characterized by a solenoid valve (200) having a coil (220) that is actuated and acts on said plunger (202) to move said seat (40') and terminate communication between said second chamber (52) and reservoir (32) during said second brake application.

4. The master cylinder (12) as recited in claim 2 wherein said actuation means is further characterized by a stop member (28') which limits the movement of said second piston (44) toward the first chamber (50) and allows compression of said second resilient means (48).

5. The master cylinder (12) as recited in claim 3 wherein said solenoid valve (200) is characterized by a low pressure seal (221) which allows fluid communication between said reservoir (32) and said second chamber (52) and a high pressure seal (222) which prevents fluid communication between said second chamber (52) and said reservoir (32).

6. The master cylinder (12) as recited in claim 2 wherein said cylindrical base (206) for said plunger (202) is characterized by being urged by said second resilient means (48) to a rest position.

7. The master cylinder (12) as recited in claim 1 wherein said actuation means is characterized by said first (14) and second (200) input members being simultaneously actuated in the development of a brake application.

8. The master cylinder (12) as recited in claim 1 wherein said second brake application is characterized by supplementing a manual parking brake application for said vehicle.

* * * * *